(No Model.)
B. BIDWELL.
ELECTRICAL RAILWAY.
No. 373,046. Patented Nov. 15, 1887.
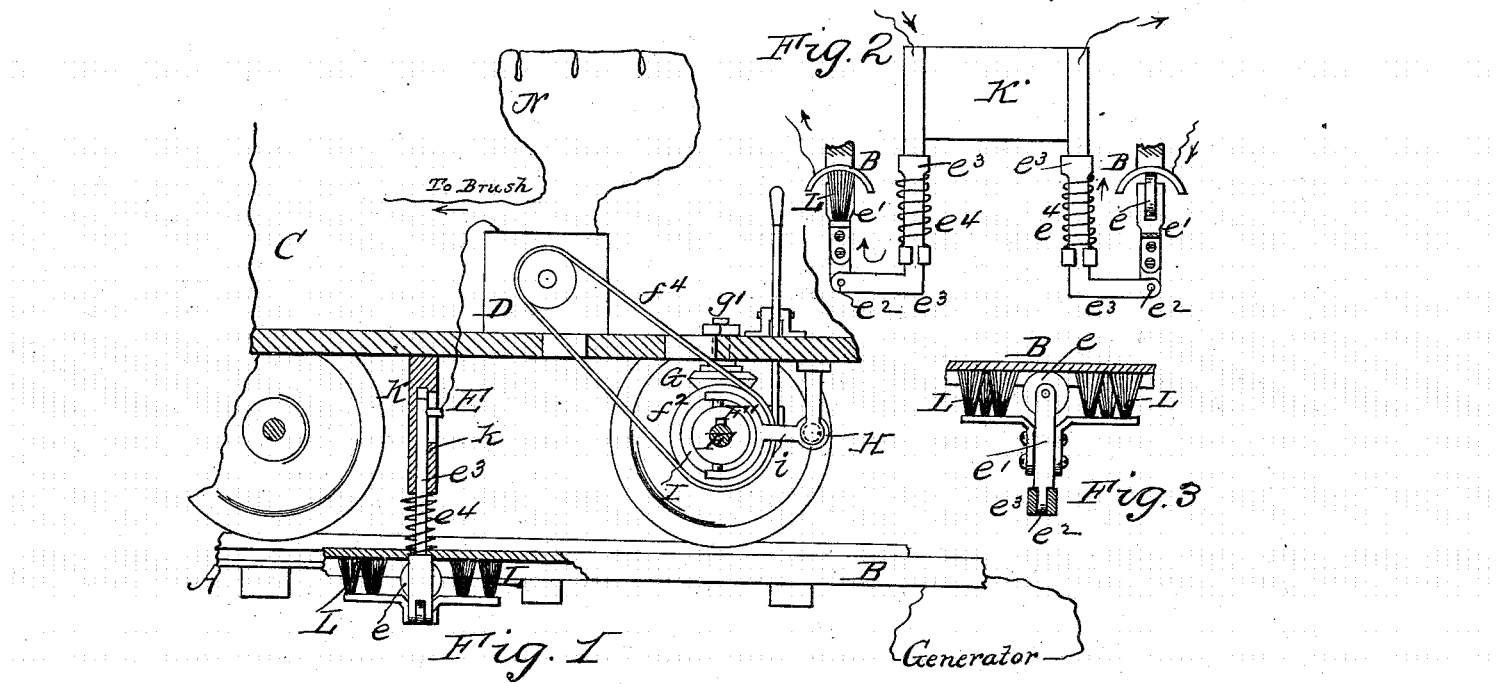
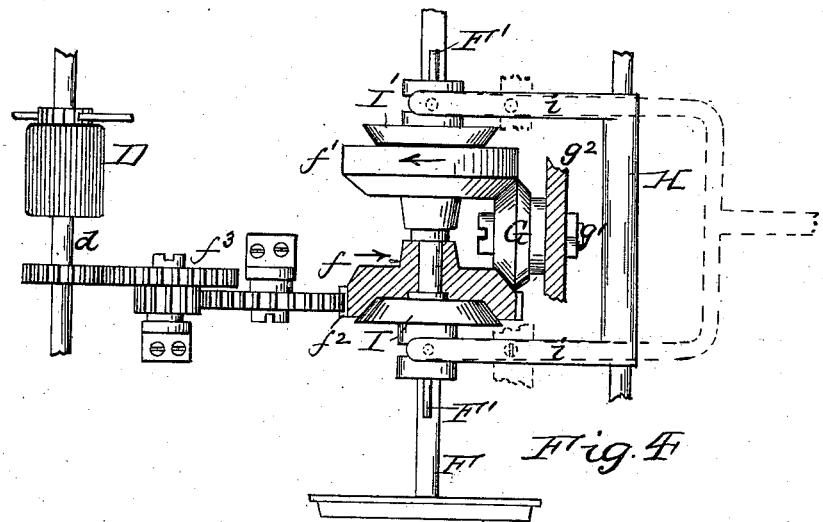
WITNESSES:
R. H. Van Stavoren
S. Oler
INVENTOR,
Benson Bidwell
By S. J. Van Stavoren
ATTORNEY

UNITED STATES PATENT OFFICE.

BENSON BIDWELL, OF PHILADELPHIA, PENNSYLVANIA, ASSIGNOR OF ONE-HALF TO CHARLES F. BIDWELL, OF INDIANAPOLIS, INDIANA.

ELECTRICAL RAILWAY.

SPECIFICATION forming part of Letters Patent No. 373,046, dated November 15, 1887.

Application filed January 8, 1885. Serial No. 152,243. (No model.)

*To all whom it may concern:*

Be it known that I, BENSON BIDWELL, a citizen of the United States, residing at Philadelphia, in the county of Philadelphia and State of Pennsylvania, have invented certain new and useful Improvements in Electrical Railways, of which the following is a specification, reference being had therein to the accompanying drawings, wherein—

Figure 1 is a longitudinal section of a part of a car and roadway, illustrating my improvements. Fig. 2 is a face elevation of the brushes or rollers for the traveling connections for the car, and showing end view of the line-conductors. Fig. 3 is a detail section of same; and Fig. 4 is a plan view, partly sectional, of motor-shaft, and the starting, stopping, and reversing mechanism for the car-driving axle.

My invention has relation to electric railways, particularly to the manner of rotating or running the electric motor of the car, to stopping and starting the car, and reversing its direction of travel, and to the formation of the contact-brushes on traveling connections of the car.

My invention accordingly consists of the combination, construction, and arrangement of parts, as hereinafter described and claimed.

In the drawings, A represents a line of railway, either surface or elevated; B B, the electric line-conductors; and C, the car, having electric motor D, traveling-connections E, and driving-axle F. The line-conductors B may be concave, as shown, or be otherwise configured in cross-section, as desired, and they may be arranged or supported in position in any of the well-known ways, preferably with their open bottoms or under surfaces downward. They are in circuit with a generator located at any suitable point along the line of way, and, if desired, more than one generator or dynamo-electric machine may be used.

Upon the driving-axle F are loosely mounted two miter-wheels, $f$ and $f'$, the former of which may have peripheral teeth $f^2$, for engagement with a train of gearing, $f^3$, in gear with the motor-shaft $d$, as shown in Fig. 4, or said periphery may be otherwise formed and be in gear with shaft $d$ by means of a belt, $f^4$, as indicated in Fig. 1. If desired, however, a drive-chain or analogous device may be substituted for said belt. The wheels $f f'$ are placed in gear with one another by a bevel-wheel, G, or idler, which is mounted upon a fixed shaft or support, $g'$, attached to the floor of the car, as represented in Fig. 1, or to a bracket, $g^2$, suitably secured to the car, as indicated in Fig. 4.

The idler G rotates wheel $f'$ in a contrary direction to that imparted to wheel $f$ by the armature-shaft $d$, as indicated by the arrows in Fig. 4, and accordingly as one or the other of wheels $f f'$ is in gear with the axle F it is rotated in a different or opposite direction to start and propel the car correspondingly or in reverse directions, and when both wheels $f f'$ are out of gear with the axle or rotate loosely thereon the latter is not revolving and the motion of the car is stopped.

The wheels $f f'$, which may be gear or friction wheels, are placed in gear with axle F by means of axle splines or feathers F' and friction or other clutches, I I', respectively, which are arranged as shown and have operating-levers $i i$ connected to a sliding bar, H, suitably supported, or they may be pivoted as indicated by dotted lines in Fig. 4, in order that they may be moved together to cause one or the other of said clutches to engage with its respective wheel $f$ or $f'$ to effect a movement or travel of the car in the proper direction and a reversal of such direction or a cessation of such movement whenever desired. It will be noted, therefore, that the car can be started, stopped, and have its direction of travel changed without affecting the rotation or speed and power of the armature-shaft $d$, as it continuously runs in one or the same direction during the entire trip of the car; hence the full power of the same is always exerted or available for use under any and all conditions of travel.

The car traveling connection E has terminal brushes or rollers $e$ for contact with the line-conductors B. These rollers $e$ are journaled in upwardly-projecting bars $e'$, pivoted at $e^2$, to separate or insulated rods $e^3$, which enter sockets $k$ in a bracket, K, secured to the car. The rods $e^3$ are provided with spiral or other springs, $e^4$, interposed between shoulders on said rods and the bracket K, as shown in Fig. 1. The action of these springs imparts to the rollers $e$ an upward pressure-contact with the line-conductors and automatically keeps the former in contact with the latter during any vertical vibration of the car, while the pivoted bars $e'$ permit said rollers to yield to the lateral swaying of the car without breaking the contact with the line-conductors. If desired, the rods $e^3$ may be made in sections and have their springs $e^4$ arranged as shown in Fig. 2.

In line with rollers $e$, and on either or both sides thereof, are upwardly-projecting sweepers L, which are preferably fastened to the bars $e'$ in any suitable manner. These sweepers keep the contact-surfaces of the line-conductors clean or bright, to enable the rollers $e$ to at all times obtain good electric contact therewith.

If desired, the car-circuit may include lamps N.

What I claim is—

1. The combination of a line of railway-tracks, a line of electric conductors, a car having an electric motor and a traveling current-collector for contact with said conductors, bevel-wheels $f$ $f'$, having clutch mechanism located on one of the axles of the car, idler G, meshing with wheels $f$ and $f'$, and a gear, $f^2$, on wheel $f$, in gear with the armature-shaft of the car-motor, substantially as and for the purpose set forth.

2. In an electric railway, the combination of open-bottom conductors B, and a car having traveling connections having sectional or sliding rods with springs interposed between them, upwardly-projecting pivoted rods on one of said sections, and brushes on the upper ends of said pivoted rods for contact with the inner bottom surfaces of the conductors, substantially as shown and described.

3. In an electric railway, the combination of open-bottom conductors and a car having traveling connections E, composed of sliding rods $e^3$, having springs $e^4$, upwardly-projecting pivoted rods $e'$, and brushes $e$, for contact with the inner bottom surfaces of the conductors, substantially as shown and described.

4. In an electric railway, the combination of a line of conductors having open bottoms and a car having traveling connections provided with upwardly-projecting brushes for contact with the inner bottom surfaces of the conductors, and upwardly-projecting sweepers on each side of the brushes, as and for the purpose set forth.

In testimony whereof I affix my signature in presence of two witnesses.

BENSON BIDWELL.

Witnesses:
JOHN RODGERS,
S. J. VAN STAVOREN.